United States Patent
Hou et al.

(10) Patent No.: US 11,035,976 B2
(45) Date of Patent: Jun. 15, 2021

(54) DECOUPLING TENSOR COMPONENTS WITHOUT MATRIX INVERSION

(71) Applicant: Halliburton Energy Services, Inc., Houston, TX (US)

(72) Inventors: Junsheng Hou, Kingwood, TX (US); Michael S. Bittar, Houston, TX (US); Yijing Fan, Singapore (SG); Li Pan, Singapore (SG); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/633,830

(22) PCT Filed: Mar. 6, 2019

(86) PCT No.: PCT/US2019/020941
§ 371 (c)(1),
(2) Date: Jan. 24, 2020

(65) Prior Publication Data
US 2021/0003733 A1    Jan. 7, 2021

(51) Int. Cl.
*G01V 3/28*    (2006.01)
*G01V 3/38*    (2006.01)
(Continued)

(52) U.S. Cl.
CPC .......... *G01V 3/28* (2013.01); *G01V 1/40* (2013.01); *G01V 3/17* (2013.01); *G01V 3/38* (2013.01)

(58) Field of Classification Search
CPC ... G01V 3/28; G01V 3/17; G01V 3/38; G01V 1/40
See application file for complete search history.

(56) References Cited

U.S. PATENT DOCUMENTS

| 6,163,155 A | 12/2000 | Bittar |
|---|---|---|
| 8,274,289 B2 | 9/2012 | Bittar et al. |

(Continued)

FOREIGN PATENT DOCUMENTS

WO    2018222208 A1    6/2018

OTHER PUBLICATIONS

Fang et al., Determination of Intrinsic Dip and Azimuth from LWD Azimuthal-Propagation Resistivity Measurements in Anisotropic Formations, Aug. 2010 SPE Reservoir Evaluation & Engineering, pp. 667-678 (Year: 2010).*

(Continued)

*Primary Examiner* — Toan M Le
(74) *Attorney, Agent, or Firm* — Gilliam IP PLLC

(57) ABSTRACT

Numerical and/or semi-analytical methods are leveraged to decouple a complete set of nonzero electromagnetic field tensor components (118) from detected signal data (119). Nine nonzero components can serve as inputs for a three-dimensional inversion process to determine formation properties. A resistivity tool (100) containing at least one transmitter (111) and at least one receiver (108, 109) at tilted angles receives an electromagnetic signal throughout a rotation. A difference in the azimuthal positions of the transmitter(s) and receiver(s) during rotation of the resistivity tool can result in an azimuthal offset between resistivity tool subs. The components (118) are decoupled from the detected signal data (119) numerically or semi-analytically according to whether the azimuthal offset angle is known. If the azimuthal offset angle is known, the nine components are determined numerically through curve fitting. If the azimuthal offset angle is unknown, a semi-analytical process is used to solve for the nine components.

18 Claims, 8 Drawing Sheets

(51) Int. Cl.
  *G01V 1/40*   (2006.01)
  *G01V 3/17*   (2006.01)

(56) References Cited

U.S. PATENT DOCUMENTS

| | | |
|---|---|---|
| 2013/0073206 A1* | 3/2013 | Hou .................. G01V 3/30 |
| | | 702/7 |
| 2013/0144530 A1 | 6/2013 | Bittar et al. |
| 2015/0285061 A1 | 10/2015 | Wu et al. |
| 2015/0369952 A1* | 12/2015 | Wu .................. G01V 3/30 |
| | | 702/7 |
| 2016/0187521 A1 | 6/2016 | Homan et al. |
| 2016/0209540 A1 | 7/2016 | Frey et al. |
| 2017/0052273 A1 | 2/2017 | Yang |
| 2018/0136356 A1 | 5/2018 | Wilson et al. |
| 2018/0372908 A1 | 12/2018 | Hou |
| 2020/0003930 A1 | 1/2020 | Ma et al. |

OTHER PUBLICATIONS

PCT Application Serial No. PCT/US2019/020941, International Search Report, dated Dec. 4, 2019, 3 pages.
PCT Application Serial No. PCT/US2019/020941, International Written Opinion, dated Dec. 4, 2019, 5 pages.
Dupuis, et al., "Automatic inversion of deep-directional-resistivity measurements for well placement and reservoir description", Society of Exploration Geophysicists, The Leading Edge, vol. 34, Issue 05, May 2015, pp. 504-512.
Sviridov, et al., "New Software for Processing of LWD Extradeep Resistivity and Azimuthal Resistivity Data", Society of Petroleum Engineers, SPE Reservoir Evaluation & Engineering, vol. 17, Issue 02., May 2014, 20 pages.

\* cited by examiner

DECOUPLING TENSOR COMPONENTS WITHOUT MATRIX INVERSION

TECHNICAL FIELD

The disclosure generally relates to the field of obtaining oil, gas, water, soluble or meltable materials or a slurry of minerals from wells, and more particularly to surveying or testing.

BACKGROUND ART

A rotating multi-sub logging while drilling (LWD) electromagnetic resistivity tool ("resistivity tool") captures rotational measurements for evaluation of geological conditions of a geological formation surrounding a wellbore. Transmitters and receivers are located on multiple modularized subs of the resistivity tool for transmission and subsequent detection of an electromagnetic signal. Detected signals are decoupled into electromagnetic field tensor components ("components") for input into an inversion process for determining formation properties. The resistivity tool often assumes a one-dimensional (1-D) model of variation in the formation properties, accordingly resulting in an assumed value of zero for a subset of the components. The nonzero components can be obtained through matrix inversion operations for subsequent input into a 1-D inversion process.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

To avoid the computational cost of downhole matrix inversion operations for decoupling components from a signal detected by a resistivity tool, numerical and/or semi-analytical methods can be leveraged to obtain a complete set of nonzero electromagnetic field tensor components. The nine nonzero components corresponding to a full electromagnetic field tensor can then serve as inputs for a three-dimensional (3-D) inversion process. Obtaining nine components for input facilitates accurate recovery of the 3-D formation model. The resistivity tool, which includes at least one transmitter and/or at least one receiver (e.g., one transmitter and two receivers) at tilted angles, measures complex voltages at a determined number of azimuthal positions throughout a full rotation of the resistivity tool. A difference in the azimuthal positions of the transmitter(s) and receiver(s) during rotation of the resistivity tool can result in an azimuthal offset between the resistivity tool subs. The nine nonzero components are decoupled from the complex voltages measured at each of the resistivity tool azimuthal positions numerically or semi-analytically according to whether the azimuthal offset angle is known. Neither the numerical method nor the semi-analytical method of calculating the components involves matrix inversion operations, which provides for a less computationally expensive method of component decoupling.

If the azimuthal offset angle is known, the nine components are determined numerically through curve fitting with the complex voltages measured at each of the resistivity tool receivers and solving for the components based on relationships with coefficients obtained during curve fitting (i.e., fitting a curve representation in the form of an equation) without necessitating matrix inversion. If the azimuthal offset angle is unknown, an azimuthal offset angle minima is calculated and used in a semi-analytical process to solve for the nine components. Sum and difference signals are identified based on detected voltages from parallel and/or perpendicular transmitter-receiver pairs, from which five of the nine components can be determined. The remaining components are obtained with a tensor rotation. To increase efficiency of downhole communications, the decoupling operations may be performed downhole. The individual decoupled components can then be communicated to the surface rather than sending the electromagnetic field detected at each azimuthal position of a complete resistivity tool rotation.

Example Illustrations

Figure 1:
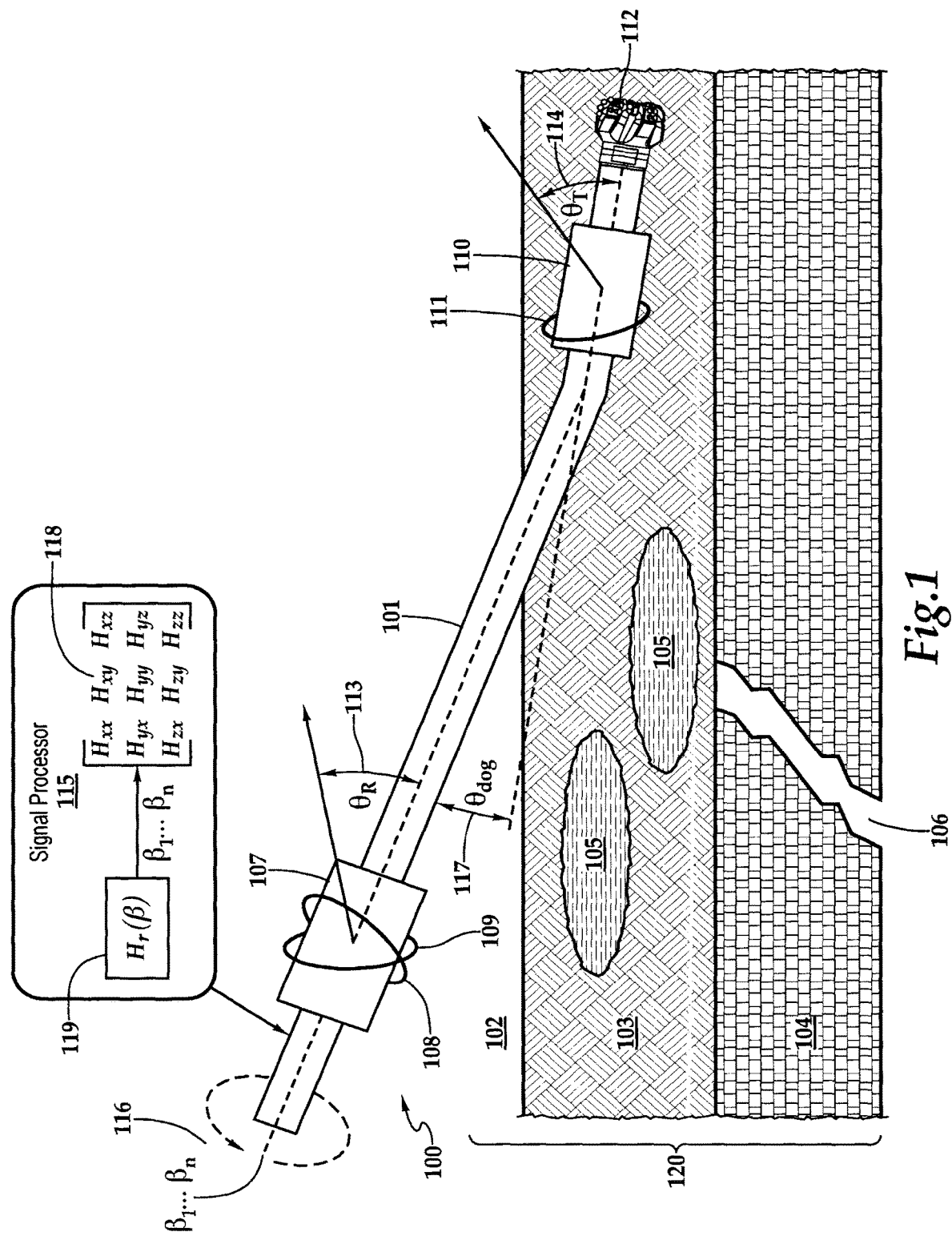
FIG. 1 depicts an example of a resistivity tool for performing downhole decoupling of electromagnetic field tensor components from a detected signal.

FIG. 1 depicts an example of a resistivity tool for performing downhole decoupling of electromagnetic field tensor components from a detected signal. FIG. 1 depicts a resistivity tool 100 ("tool 100") operating in a downhole environment which exhibits 3-D variation in the formation 120. In this example, the formation 120 is composed of an upper layer 102, middle layer 103, and lower layer 104. The middle layer 103 contains fluids 105. The lower layer 104 contains cracks and/or gaps 106. The fluids 105, cracks and/or gaps 106, and differences across boundaries between the upper layer 102, middle layer 103, and lower layer 104 introduce variation in the formation 120 with respect to each axis of the tool 100. A drill bit 112 is attached to the bottommost end of the tool 100.

The tool 100 contains at least one rotating transmitter antenna paired with at least one rotating receiver antenna. The depicted tool 100 includes one transmitter and two receivers. A tool may alternatively contain two transmitters and one receiver. The transmitter of the tool 100 transmits signals in one or more directions and the receivers receive signals directed from one or more directions. In FIG. 1, the tool 100 includes a transmitter sub 111 located above the drill bit 112 and a receiver sub 107 above the transmitter sub 111. The transmitter sub 111 and receiver sub 107 are connected via a connecting tubular 101. The longitudinal axes of the transmitter sub 111 and the receiver sub 107 form a dogleg angle ($\theta_{dog}$) 117 as a result of wellbore curvature (e.g., due to directional or slant drilling). The transmitter sub 111 includes a tilted coil transmitter 110. The coils of the transmitter 110 may be a conductive wire (e.g., copper or aluminum) and may be formed around a magnetic or non-magnetic core. The transmitter 110 angle of tilt ($\theta_T$) 114 is given by the angle between the tilt plane normal vector of the transmitter 110 and the longitudinal axis of the transmitter sub 111. The receiver sub 107 includes two tilted coil receivers 108 and 109. The coils of the receivers 108 and 109 may also be a conductive wire (e.g., copper or aluminum) and may be formed around a magnetic or non-magnetic core. The receiver 109 angle of tilt ($\theta_R$) 113 is given by the angle between the tilt plane normal vector of the receiver 109 and the longitudinal axis of the receiver sub 107. Though not depicted in FIG. 1, the receiver 108 angle of tilt is given by the angle between the tilt plane normal vector of the receiver 108 and the longitudinal axis of the receiver sub 107. The transmitter 110 and receiver 108 form a perpendicular transmitter-receiver pair, where $\theta_T = -\theta_R$. The transmitter 110 and receiver 109 form a parallel transmitter-receiver pair, where $\theta_T = \theta_R$.

The transmitter 110 transmits electromagnetic signals into the surrounding formation 120. Signals may be transmitted near the tool 100, in regions in front of the tool 100, in regions behind the tool 100, and/or regions adjacent to the tool 100. The receivers 108 and 109 detect the electromagnetic signal which has traversed the formation 120. Transmitter-receiver pairs may be activated such that one of the receivers 108 and 109 is active at a given time or such that both of the receivers 108 and 109 are active at a given time. For instance, the perpendicular transmitter-receiver pair may be the active transmitter-receiver pair. The parallel transmitter-receiver pair may also be active or may be inactive during the activity of the perpendicular transmitter-receiver pair.

The tool 100 is rotated about its longitudinal axis during electromagnetic signal transmission and detection operations. The receivers 108 and/or 109 detect a signal ($H_r(\beta)$ 119 in FIG. 1) at each of a series of N azimuthal positions 116 ($\beta_1 \ldots \beta_N$ in FIG. 1) throughout the rotation of the tool 100. The detected signal corresponds to an electromagnetic signal emitted by the transmitter 110 which has traversed the formation 120 prior to subsequent detection. The detected signal may be received as voltage measurements, current measurements, etc. For instance, the receivers 108 and/or 109 can receive the signal while measuring voltage at each of the azimuthal positions 116. The raw signal data $H_r(\beta)$ 119 is representative of the detected signal and may be represented with the relationship shown in Equation 1:

$$H_r(\beta_i) = \begin{bmatrix} \sin\theta_t \cos\beta_i \\ \sin\theta_t \sin\beta_i \\ \cos\theta_t \end{bmatrix}^T \begin{bmatrix} H_{xx} & H_{yx} & H_{xz} \\ H_{xy} & H_{yy} & H_{zy} \\ H_{xz} & H_{yz} & H_{zz} \end{bmatrix} \begin{bmatrix} \sin\theta_r \cos\beta_i \\ \sin\theta_r \sin\beta_i \\ \cos\theta_r \end{bmatrix} \quad (1)$$

The electromagnetic field is detected at each azimuthal position $\beta_i$ of the N azimuthal positions 116, where i iterates from 1 to N, and N is a nonzero positive integer. For example, for N=32 where the set of azimuthal positions $\beta$ is symmetric, the electromagnetic field is obtained at each of 32 azimuthal angles $\beta_1$ through $\beta_{32}$ (i.e., $\beta_1$=11.25 degrees, $\beta_2$=22.5 degrees, . . . $\beta_{32}$=360 degrees). The resulting measurements are recorded in N bins, where each bin corresponds to a measurement recorded for a particular azimuthal position $\beta_i$.

A signal processor 115 processes the detected signal data $H_r(\beta)$ 119 detected at each azimuthal position $\beta_i$ of the series of azimuthal positions 116. The components $H_{ij}$ of $H_r(\beta)$ 119 are decoupled from the detected signal data $H_r(\beta)$ 119 to obtain a full set of electromagnetic field tensor components 118 ("decoupled components 118"). The signal processor 115 may be located downhole such that $H_r(\beta)$ 119 is decoupled downhole and the decoupled components 118 are sent to the surface of the formation 120. The decoupled components 118 are represented with a 3-by-3 matrix corresponding to an electromagnetic field tensor. The set of decoupled components 118 is a "full set" because components are decoupled from $H_r(\beta)$ 119 to determine values for each of the nine matrix components (i.e., $H_{ij}$ for i, j=x, y, z) rather than for a particular subset of the matrix components. The subscripts "ij" denote orientation of the receivers 108 and 109 and transmitter 110 when transmitting and detecting an electromagnetic signal with respect to a coordinate system of the tool 100. For example, $H_{xz}$ indicates the signal received when one of the receivers 108 or 109 is oriented in the z-direction when detecting the signal emitted by the transmitter 110 when oriented in the x-direction. In the tool coordinate system, a z-axis aligns with the tool 100 axis, an x-axis is perpendicular to the z-axis with its positive direction directed towards the tool 100 high side, and a y-axis is perpendicular to the x-axis and z-axis.

The method by which the decoupled components 118 are decoupled from $H_r(\beta)$ 119 is dependent upon whether the value of an azimuthal offset $\beta_{ref}$ between the transmitter 110 and receivers 108 and 109 is known. Though not depicted in FIG. 1, the value of $\beta_{ref}$ is based on the difference in the azimuthal positions of the transmitter 110 and the receivers 108 and/or 109 (the "tool face offset"). Differences in azimuthal positions may arise as a result of differences in rotation of the transmitter sub 111 and the receiver sub 107. For instance, the subs 107 and 111 may be rotating at different speeds and/or at least partially independent of each other, resulting in a tool face offset. If $\beta_{ref}$ is known (e.g., if the tool face offset can be acquired through the use of sensors on the transmitter sub 111 and the receiver sub 107), each of the components $H_{ij}$ are decoupled from $H_r(\beta)$ 119 numerically through curve fitting to yield the decoupled components 118. If $\beta_{ref}$ is unknown, its value can be solved for with nonlinear minimization, after which the decoupled components 118 are obtained semi-analytically.

Figure 2:
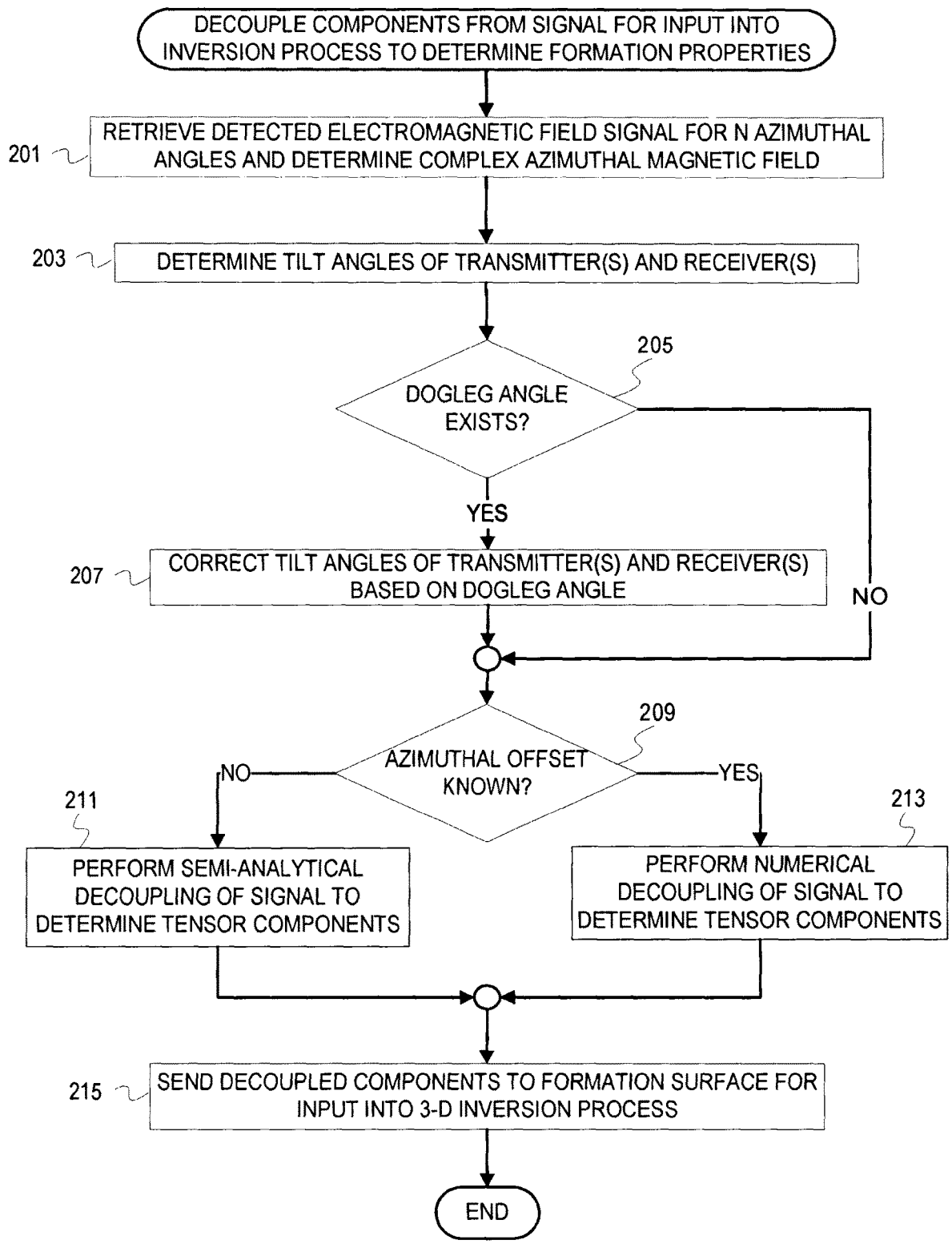
FIG. 2 depicts a flowchart of example operations for decoupling a detected signal to obtain a full nine-component set of electromagnetic field tensor components without matrix inversion.

FIG. 2 depicts a flowchart of example operations for decoupling a detected signal to obtain a full nine-component set of electromagnetic field tensor components without matrix inversion. The nine-component electromagnetic field tensor $H_t$ may be represented as a three-by-three matrix as follows:

$$\begin{bmatrix} H_{xx} & H_{yx} & H_{zx} \\ H_{xy} & H_{yy} & H_{zy} \\ H_{xz} & H_{yz} & H_{zz} \end{bmatrix}$$

The example operations may be performed for each azimuth angle $\beta_1$ through $\beta_N$. The example operations assume the electromagnetic field has been measured by a rotating resistivity tool with cross-antenna transmitter receiver pairs, where the tool contains a parallel transmitter-receiver pair ($\theta_t=\theta_r$) and a perpendicular transmitter-receiver pair ($\theta_t=-\theta_r$). For instance, the tool may include one tilted transmitter and two tilted receivers or two tilted transmitters and one tilted receiver. Additional transmitters and/or receivers may be present. The example operations refer to a signal processor as performing the example operations for consistency with FIG. 1, although naming of software and program code can vary among implementations.

The signal processor retrieves the electromagnetic field signal detected at azimuth angles $\beta_1$ through $\beta_N$ and determines the complex azimuthal electromagnetic field $H_r(\beta)$ (201). The detected signal data $H_r(\beta)$ for receiver r is output to the signal processor as a result of signal transmission and detection operations. The detected signal data $H_r(\beta)$ may be represented with the relationship as given in Equation 1 in reference to FIG. 1.

The signal processor determines the angles of tilt of the transmitter(s) and the receiver(s) (203). The angles of tilt $\theta_t$ and $\theta_r$ may be obtained from sensors which correspond to each transmitter and receiver present on the resistivity tool. Multiple transmitters and/or receivers may be present. For example, the resistivity tool may include one transmitter and two receivers. The resistivity tool may also include one transmitter and three receivers. The tilt angles are retrieved for each of the transmitters and receivers present on the tool.

The signal processor identifies whether a dogleg angle exists between the transmitter and receiver subs (205). A dogleg angle $\theta_{dog}$ exists when the longitudinal axes of the transmitter and receiver subs are positioned at an angle relative to each other. The presence of a dogleg angle between transmitter and receiver subs of the resistivity tool may be determined by leveraging sensors present on the resistivity tool.

If a dogleg angle exists between the axes of the transmitter and receiver subs, the signal processor adjusts the transmitter and receiver angles of tilt based on the dogleg angle (207). Adjustment of the angles of tilt $\theta_t$ and $\theta_r$ based on the dogleg angle $\theta_{dog}$ ("dogleg correction") is performed so the resulting decoupled components account for the dogleg angle $\theta_{dog}$. Dogleg correction of the angles $\theta_t$ and $\theta_r$ may leverage trigonometric relationships between the transmitter axis, receiver axis, and the intersection point between the axes. As an example, if $\theta_t$ is measured to be 35 degrees, $\theta_r$ is measured to be 40 degrees, and $\theta_{dog}$ is 20 degrees, the values of $\theta_t$ and $\theta_r$ are corrected to account for the 20 degree dogleg angle. The dogleg corrected values of $\theta_t$ and $\theta_r$ are 45 degrees and 30 degrees, respectively. Dogleg correction of the angles of tilt increases the accuracy of the values determined for the decoupled components and therefore improves the accuracy of the recovered 3-D formation model resulting from inversion.

The signal processor determines whether the azimuthal offset $\beta_{ref}$ is known (209). The azimuthal offset $\beta_{ref}$ is the difference between the azimuthal position of the transmitter and the azimuthal position of the receiver. $\beta_{ref}$ may be based on the tool face offset between the transmitter sub and receiver sub. For instance, the azimuthal positions of the transmitter and receiver may differ as a result of independent rotation and/or different rotation speeds of the respective resistivity tool subs. The presence of an additional tool which can measure the azimuthal offset and/or resistivity tool sensors can determine whether or not the value of $\beta_{ref}$ is known. If known, the measured azimuthal offset can be obtained depending upon the additional tool or tool sensors.

For instance, the signal processor can retrieve from a location to which the additional tool or tool sensors store the azimuthal offset measurement if not communicated directly to the signal processor. Embodiments may not perform this determination if the setting is a constant. For instance, the signal processor can be configured to retrieve the azimuthal offset when loaded on a tool that has the additional tool or tool sensors to measure the azimuthal offset.

If the value of $\beta_{ref}$ is unknown, the detected signal $H_r(\beta)$ is decoupled semi-analytically to determine the values of the nine nonzero electromagnetic field tensor components (211). The semi-analytical component decoupling method determines the value of $\beta_{ref}$ through constrained minimization prior to analytically determining the electromagnetic field tensor components. The semi-analytical method of component decoupling is further described in FIG. 3.

If the value of $\beta_{ref}$ is known, the detected signal $H_r(\beta)$ is decoupled numerically to determine the values of the nine nonzero electromagnetic field tensor components (213). The numerical decoupling method leverages the known value of $\beta_{ref}$ for fitting a curve generated from the azimuthal measurements. The numerical method of component decoupling is further described in FIG. 4.

The signal processor communicates the decoupled components uphole to the formation surface for input into a 3-D inversion process to determine formation properties (215). Because signal decoupling is performed downhole, the values of the electromagnetic field tensor components may be communicated to the surface individually rather than sending the detected signal obtained at each azimuthal measurement.

Figure 3:
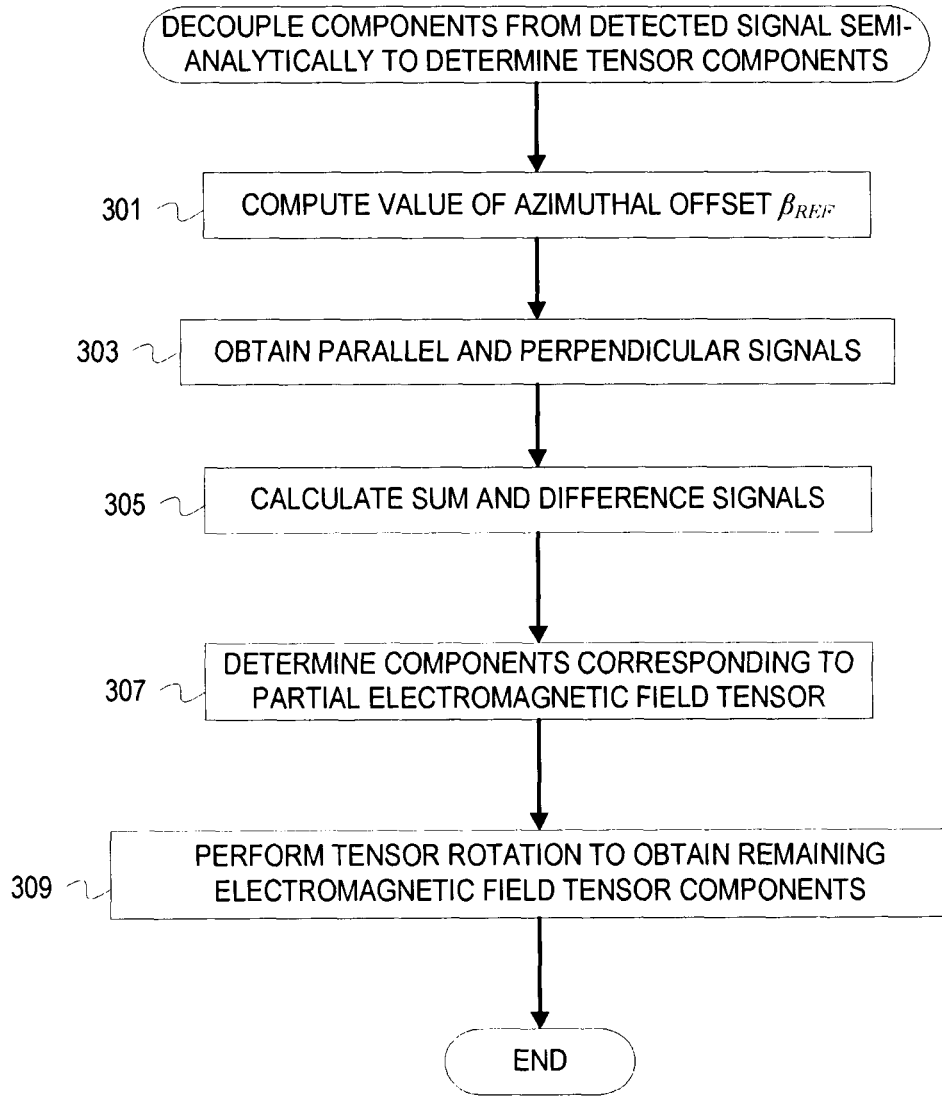
FIG. 3 depicts a flowchart of example operations for semi-analytically decoupling a nine-component set of electromagnetic field tensor components from a detected signal.

FIG. 3 depicts a flowchart of example operations for semi-analytically decoupling a nine-component set of electromagnetic field tensor components from a detected signal. The example operations can be performed for each azimuth angle $\beta i$ linearly or concurrently for azimuth angles $\beta_1$ through $\beta_N$ at which a receiver detected a signal. The example operations assume that a resistivity tool includes a parallel transmitter-receiver pair and a perpendicular transmitter-receiver pair as described with reference to FIG. 2. The example operations refer to a signal processor as performing the example operations for consistency with FIG. 1, although naming of software and program code can vary among implementations.

The signal processor computes the value of the azimuthal offset $\beta_{ref}$ (301). An azimuthal voltage measured by a receiver r at azimuth angle $\beta_i$ can be represented as follows in Equation 2:

$$V_r(\beta_i) = \left[\left(\frac{C_{xx}-C_{yy}}{2}\right)\cos 2\beta_i + \left(\frac{C_{yx}+C_{xy}}{2}\right)\sin 2\beta_i\right] + \\ [(C_{zx}+C_{xz})\cos\beta_i + (C_{zy}+C_{yz})\sin\beta_i] + \left(C_{zz}+\frac{C_{xx}+C_{yy}}{2}\right) \quad (2)$$

where each $C_{ij}$ corresponds to a component of a coupling matrix C. The subscripts i and j denote orthogonal directions the tool coordinate system. Each $C_{ij}$ indicates that voltage is received by a receiver oriented in the j-direction when a transmitter oriented in the i-direction is actively emitting electromagnetic radiation. For example, the $C_{zx}$ component indicates the voltage received by a receiver oriented in the x-direction when a transmitter is transmitting a signal in the z-direction. The relationships between components of the coupling matrix C and the electromagnetic field tensor components can be represented as follows in Equation Set 3:

$$\begin{cases} C_{xx} = H_{xx} \sin\theta_t \sin\theta_r & C_{xy} = H_{xy}\sin\theta_t \sin\theta_r & C_{xz} = H_{xz}\cos\theta_r \sin\theta_t \\ C_{yx} = H_{yx}\sin\theta_t \sin\theta_r & C_{yy} = H_{yy}\sin\theta_t \sin\theta_r & C_{yz} = H_{yz}\cos\theta_r \sin\theta_t \\ C_{zx} = H_{zx}\sin\theta_r \cos\theta_t & C_{zy} = H_{zy}\sin\theta_r \cos\theta_t & C_{zz} = H_{zz}\cos\theta_t \cos\theta_r \end{cases} \quad (3)$$

The value of the azimuthal offset $\beta_{ref}$ can be determined by solving a constrained nonlinear minimization problem. The value of $\beta_{ref}$ is computed through constrained minimization at an azimuth angle $\beta_i$ with the formula shown in Equation 4:

$$\begin{cases} \min C(\beta_{ref}) = \min\Sigma[V_{mea}(\beta_i) - V_{pre}(\beta_i)]^2 \\ \text{s.t. } 0 \le \beta_{ref} \le 360 \end{cases} \quad (4)$$

where $V_{mea}(\beta_i)$ and $V_{pre}(\beta_i)$ correspond to voltages measured for each transmitter-receiver pair.

The signal processor obtains parallel and perpendicular signals corresponding to the parallel transmitter-receiver pair and the perpendicular transmitter-receiver pair (303). The signals detected at each transmitter-receiver pair correspond to a parallel or perpendicular signal depending on the orientation of the corresponding transmitter and receiver. For instance, the resistivity tool may contain two cross-antenna receivers and one transmitter. The parallel signal is obtained from the tilted receiver which is parallel to the tilted transmitter. The perpendicular signal is obtained from the tilted receiver which is perpendicular to the tilted transmitter. The parallel signals which are obtained for receiver r, where r identifies the receiver which detected the signal, can be represented as follows in Equations 5-1 and 5-2. Equation 5-2 results from Equation 5-1 if assuming a 1-D formation model:

$$V_r^{pl}(\beta_i) = \left[\left(\frac{H_{xx} - H_{yy}}{4}\right)\cos2\beta_i + \left(\frac{H_{xy} + H_{yx}}{4}\right)\sin2\beta_i\right] + \quad (5\text{-}1)$$
$$\left[\left(\frac{H_{xz} + H_{zx}}{2}\right)\cos\beta_i + \left(\frac{H_{yz} + H_{zy}}{2}\right)\sin\beta_i\right] + \frac{2H_{zz} + H_{xx} + H_{yy}}{4}$$

$$V_r^{pl}(\beta_i) = \left(\frac{H_{xx} - H_{yy}}{4}\right)\cos2(\beta_i + \beta_{ref}) + \quad (5\text{-}2)$$
$$\left(\frac{H_{xz} + H_{zx}}{2}\right)\cos(\beta_i + \beta_{ref}) + \frac{2H_{zz} + H_{xx} + H_{yy}}{4}$$

where $V_r^{pl}$ represents the measured voltage on the receiver corresponding to the parallel transmitter-receiver pair. Similarly, the perpendicular signals which are obtained for receiver r can be represented as follows in Equations 6-1 and 6-2. Equation 6-2 results from Equation 6-1 if assuming a 1-D formation model:

$$V_r^{pr}(\beta_i) = \left[-\left(\frac{H_{xx} - H_{yy}}{4}\right)\cos2\beta_i - \left(\frac{H_{xy} + H_{yx}}{4}\right)\sin2\beta_i\right] + \quad (6\text{-}1)$$
$$\left[\left(\frac{H_{zx} - H_{xz}}{2}\right)\cos\beta_i + \left(\frac{H_{zy} - H_{yz}}{2}\right)\sin\beta_i\right] + \frac{2H_{zz} - H_{xx} - H_{yy}}{4}$$

$$V_r^{pr}(\beta_i) = -\left(\frac{H_{xx} - H_{yy}}{4}\right)\cos2(\beta_i + \beta_{ref}) + \quad (6\text{-}2)$$
$$\left(\frac{H_{zx} - H_{xz}}{2}\right)\cos(\beta_i + \beta_{ref}) + \frac{2H_{zz} - H_{xx} - H_{yy}}{4}$$

where $V_r^{pr}$ represents the measured voltage on the receiver corresponding to the perpendicular transmitter-receiver pair. The parallel and perpendicular signals can additionally be represented as follows in Equations 7 and 8:

$$V_r^{pr}(\beta_i) = E_0 + \sum_{k=1}^{2} E_k \times \cos[k(\beta_i + \beta_{ref})] \quad (7)$$

$$V_r^{pl}(\beta_i) = E_0 + \sum_{k=1}^{2} E_k \times \cos[k(\beta_i + \beta_{ref})] \quad (8)$$

The coefficients $E_0$, $E_1$, and $E_2$ can be determined with the formulas depicted in Equation Set 9:

$$E_0 = \frac{1}{2\pi}\int_0^{2\pi} V_r(\beta_i)d\beta_i \quad (9)$$
$$E_1 = \frac{1}{\pi}\int_0^{2\pi} V_r(\beta_i)\cos(\beta_i + \beta_{ref})d\beta_i$$
$$E_2 = \frac{1}{\pi}\int_0^{2\pi} V_r(\beta_i)\cos[2(\beta_i + \beta_{ref})]d\beta_i$$

where $V_r(\beta_i)$ is the measured azimuthal voltage.

The signal processor calculates sum and difference signals (305). The sum and difference signals are based on the sum and difference of the parallel and perpendicular signals obtained for the corresponding transmitter-receiver pairs. The sum signal for an azimuth angle $\beta_i$ may be represented as follows in Equations 10-1 and 10-2, where 10-2 follows from 10-1 if assuming a 1-D formation model:

$$V_r^{sum}(\beta_i) = V_r^{pl}(\beta_i) + V_r^{pr}(\beta_i) = H_{zx}\cos\beta_i + H_{zy}\sin\beta_i + H_{zz} \quad (10\text{-}1)$$

$$V_r^{sum}(\beta_i) = V_r^{pl}(\beta_i) + V_r^{pr}(\beta_i) = H_{zx}\cos(\beta_i + \beta_{ref}) + H_{zz} \quad (10\text{-}2)$$

Similarly, the difference signal for an azimuth angle $\beta_i$ may be represented as follows in Equations 11-1 and 11-2, where 11-2 follows from 11-1 if assuming a 1-D formation model:

$$V_r^{dif}(\beta_i) = V_r^{pl}(\beta_i) - V_r^{pr}(\beta_i) = \left(\frac{H_{xx} - H_{yy}}{2}\right)\cos2\beta_i + \quad (11\text{-}1)$$
$$\left(\frac{H_{xy} + H_{yx}}{2}\right)\sin2\beta_i + H_{xz}\cos\beta_i + H_{yz}\sin\beta_i + \frac{H_{xx} + H_{yy}}{2}$$

$$V_r^{dif}(\beta_i) = V_r^{pl}(\beta_i) - V_r^{pr}(\beta_i) = \quad (11\text{-}2)$$
$$\left(\frac{H_{xx} - H_{yy}}{2}\right)\cos2(\beta_i + \beta_{ref}) + H_{xz}\cos(\beta_i + \beta_{ref}) + \frac{H_{xx} + H_{yy}}{2}$$

The sum and difference signals can be generalized as follows in Equations 12 and 13:

$$V_r^{sum}(\beta_i) = E_0 + \sum_{k=1}^{2} E_k \times \cos[k(\beta_i + \beta_{ref})] \quad (12)$$

$$V_r^{sum}(\beta_i) = E_0 + \sum_{k=1}^{2} E_k \times \cos[k(\beta_i + \beta_{ref})] \quad (13)$$

The coefficients $E_0$, $E_1$, and $E_2$ can be determined with the formulas depicted in Equation Set 9.

The signal processor determines values of five components which correspond to a partial electromagnetic field tensor (307). The components $H_{zz}$, $H_{xx}$, $H_{yy}$, $H_{xz}$, and $H_{zx}$ (a "partial electromagnetic field tensor") may be solved for based on the calculated sum and difference signals and the value of $\beta_{ref}$. Values for the components of the partial electromagnetic field tensor can be determined with the following equations represented in Equation Set 14:

$$H_{zz} = \frac{1}{2\pi}\int_0^{2\pi} V_r^{sum}(\beta_i)\cos(\beta_i + \beta_{ref})d\beta_i \quad (14)$$

$$H_{zx} = \frac{1}{\pi}\int_0^{2\pi} V_r^{sum}(\beta_i)\cos(\beta_i + \beta_{ref})d\beta_i$$

$$H_{xz} = \frac{1}{\pi}\int_0^{2\pi} V_r^{dif}(\beta_i)\cos(\beta_i + \beta_{ref})d\beta_i$$

$$H_{xx} = \frac{1}{\pi}\int_0^{2\pi} V_r^{dif}(\beta_i)[1 + \cos 2(\beta_i + \beta_{ref})]d\beta_i$$

$$H_{yy} = \frac{1}{\pi}\int_0^{2\pi} V_r^{dif}(\beta_i)[1 - \cos(\beta_i + \beta_{ref})]d\beta_i$$

The signal processor performs a tensor rotation to obtain the remaining components to yield a full electromagnetic field tensor (309). To obtain values for the components $H_{xy}$, $H_{yx}$, $H_{yz}$, and $H_{zy}$ and therefore the full electromagnetic field tensor $\overline{H_t}$ through a tensor rotation, the partial electromagnetic field tensor is multiplied by rotation matrix $R(\beta_{ref})$ as shown in Equation 15:

$$\overline{H_t} = \begin{bmatrix} H_{xx} & H_{xy} & H_{xz} \\ H_{yx} & H_{yy} & H_{yz} \\ H_{zx} & H_{zy} & H_{zz} \end{bmatrix} = R(\beta_{ref}) \times \begin{bmatrix} H_{xx} & 0 & H_{xz} \\ 0 & H_{yy} & 0 \\ H_{zx} & 0 & H_{zz} \end{bmatrix} \times [R(\beta_{ref})]^T \quad (15)$$

where rotation matrix $R(\beta_{ref})$ is represented as in Equation 16:

$$R(\beta_{ref}) = \begin{bmatrix} \cos(\beta_{ref}) & \sin(\beta_{ref}) & 0 \\ -\sin(\beta_{ref}) & \cos(\beta_{ref}) & 0 \\ 0 & 0 & 1 \end{bmatrix} \quad (16)$$

The values of each of the nine electromagnetic field tensor components $H_{ij}$ for i, j=x, y, z can be obtained as a result of the tensor rotation. The individual decoupled components may be communicated to the formation surface to be subsequently leveraged as inputs into a 3-D inversion process to determine properties of the surrounding formation.

Figure 4:
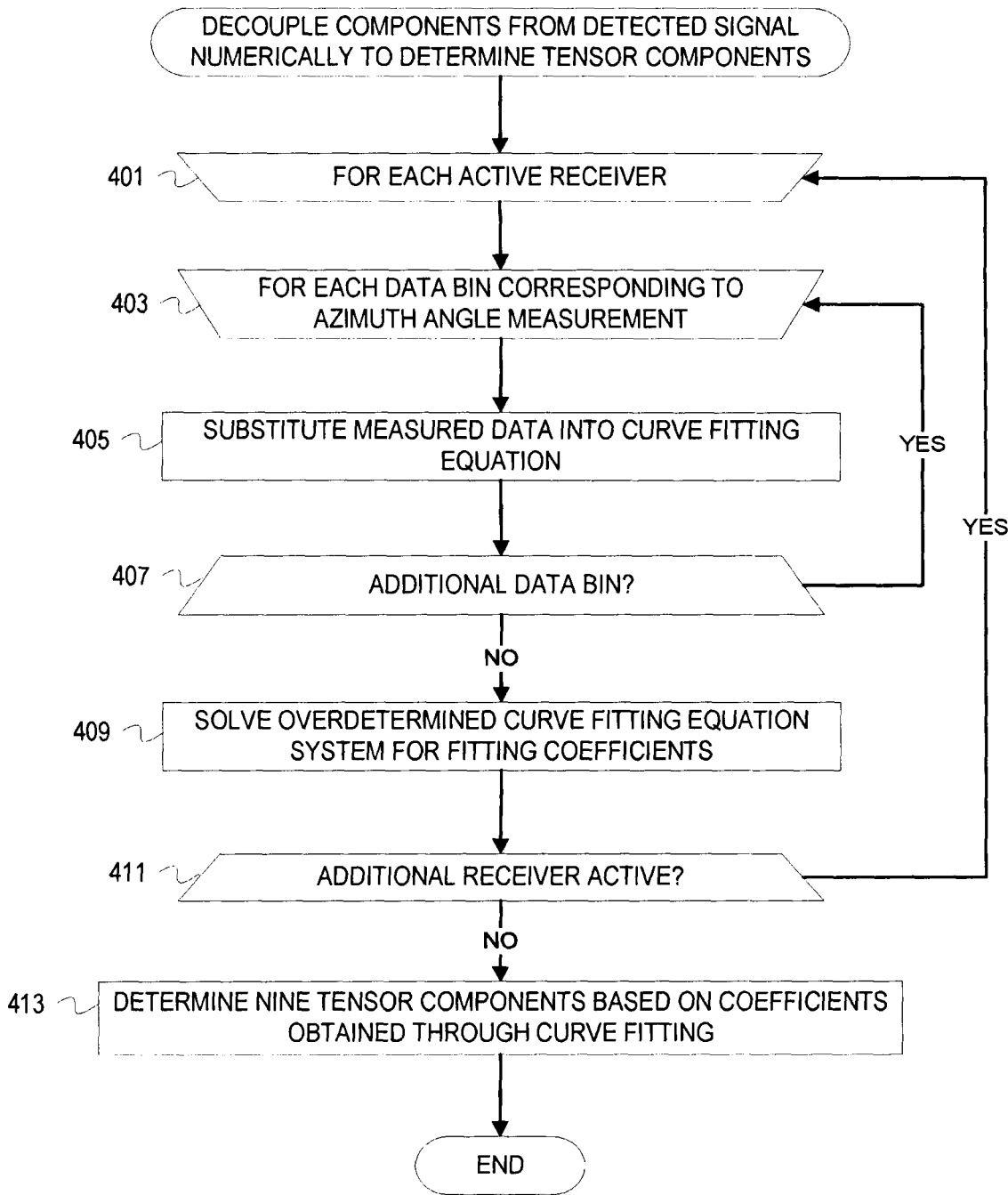
FIG. 4 depicts a flowchart of example operations for numerically decoupling a nine-component set of electromagnetic field tensor components from a detected signal.

FIG. 4 depicts a flowchart of example operations for numerically decoupling a nine-component set of electromagnetic field tensor components from a detected signal. The example operations assume that electromagnetic field measurements have been obtained from a rotating resistivity tool with two or more tilted transmitter-receiver pairs as described with reference to FIG. 2. The example operations refer to a signal processor as performing the example operations for consistency with FIG. 1, although naming of software and program code can vary among implementations.

The signal processor processes the signal detected for each active transmitter-receiver pair (401). The receiver r corresponding to the transmitter-receiver pair for which operations are currently being performed is hereinafter referred to as the "current receiver." The detected signal data $H_r(\beta_i)$ for a known $\beta_{ref}$ can be represented with the relationships shown in Equation 17:

$$H_r(\beta_i) = \begin{bmatrix} \sin\theta_t\cos\beta_i \\ \sin\theta_t\sin\beta_i \\ \cos\theta_t \end{bmatrix}^T \begin{bmatrix} H_{xx} & H_{yx} & H_{zx} \\ H_{xy} & H_{yy} & H_{zy} \\ H_{xz} & H_{yz} & H_{zz} \end{bmatrix} \begin{bmatrix} \sin\theta_r\cos(\beta_i + \beta_{ref}) \\ \sin\theta_r\sin(\beta_i + \beta_{ref}) \\ \cos\theta_r \end{bmatrix} \quad (17)$$

A coupling matrix C with components $C_{xx}$, $C_{xy}$, $C_{xz}$, $C_{yx}$, $C_{yy}$, $C_{yz}$, $C_{zx}$, $C_{zy}$, and $C_{zz}$ can be leveraged to expand Equation 17. The subscripts i and j denote orthogonal directions the tool coordinate system. Each $C_{ij}$ indicates that voltage is received by a receiver oriented in the j-direction when a transmitter oriented in the i-direction is actively emitting electromagnetic radiation. For example, the $C_{xz}$ component indicates the voltage received by a receiver oriented in the z-direction when a transmitter is transmitting a signal in the x-direction. With coupling matrix C, the representation of the detected signal presented in Equation 17 can be expanded into the form shown in Equation 18:

$$H_r(\beta_i) = \left(\frac{C_{xx} - C_{yy}}{2}\right)\cos(2\beta_i + \beta_{ref}) + \quad (18)$$

$$\left(\frac{C_{xy} + C_{yx}}{2}\right)\sin(2\beta_i + \beta_{ref}) +$$

$$(C_{zx}\cos\beta_{ref} + C_{zx}\sin\beta_{ref} + C_{xz})\cos\beta_i +$$

$$(-C_{zx}\sin\beta_{ref} + C_{zy}\cos\beta_{ref} + C_{yz})\sin\beta_i +$$

$$\left(\frac{C_{xx} + C_{yy}}{2}\right)\cos\beta_{ref} + \left(\frac{C_{xy} - C_{yx}}{2}\right)\sin\beta_{ref} + C_{zz}$$

The relationships between components of the coupling matrix C and components of the electromagnetic field tensor can be represented as follows in Equation Set 19:

$$\begin{cases} C_{xx} = H_{xx}\sin\theta_t\sin\theta_r & C_{yx} = H_{yx}\sin\theta_t\sin\theta_r & C_{zx} = H_{zx}\cos\theta_t\sin\theta_r \\ C_{xy} = H_{xy}\sin\theta_t\sin\theta_r & C_{yy} = H_{yy}\sin\theta_t\sin\theta_r & C_{zy} = H_{zy}\cos\theta_t\sin\theta_r \\ C_{xz} = H_{xz}\sin\theta_t\cos\theta_r & C_{yz} = H_{yz}\sin\theta_t\cos\theta_r & C_{zz} = H_{zz}\cos\theta_t\cos\theta_r \end{cases} \quad (19)$$

The signal processor processes the measurements obtained for data bin i taken at azimuth angle $\beta_i$ for each azimuth angle $\beta_1$ through $\beta_N$ (403). The data bin i for which operations are currently being performed is hereinafter referred to as the "current data bin."

The signal processor substitutes the measured data corresponding to the current data bin into a curve fitting equation (405). The curve fitting equation is shown in Equation 20:

$$H_r(\beta_i) = A \cos(2\beta_i + \beta_{ref}) + B \sin(2\beta_i + \beta_{ref}) + C \cos \beta_i + D \sin \beta_i + E \quad (20)$$

where each fitting coefficient A, B, C, D, and E can be represented as shown in Equation Set 21:

$$A = (C_{xx} - C_{yy})/2 \quad (21)$$

$$B = (C_{xy} + C_{yx})/2$$

$$C = C_{zx} \cos \beta_{ref} + C_{zy} \sin \beta_{ref} + C_{xz}$$

$$D = -C_{zx} \sin \beta_{ref} + C_{zy} \cos \beta_{ref} + C_{yz}$$

$$E = C_{zz} + (C_{xx} + C_{yy}) \cos \beta_{ref}/2 + (C_{xy} - C_{yx}) \sin \beta_{ref}/2$$

The signal processor substitutes azimuthal bin data into the curve fitting equation until each data bin 1 through N has been accounted for in curve fitting (407). Equation 20 can be implemented for each value of $\beta_i$ corresponding to an azimuthal measurement point for a known $\beta_{ref}$, where a measurement point is a unique combination of values for $Z_r, \beta, \beta_i, \beta_{ref}, \theta_t,$ and $\theta_r$ at a given measured depth. Substituting bin data into Equation 20 for each $\beta_i$ for i=1 through N results in an equation system from which the fitting coefficients A, B, C, D, and E can be solved. The resulting equation system for a receiver r is shown in Equation Set 22:

$$H_r(\beta_1) = A \cos(2\beta_1 + \beta_{ref}) + B \sin(2\beta_1 + \beta_{ref}) + C \cos \beta_1 + D \sin \beta_1 + E \quad (22)$$

$$H_r(\beta_2) = A \cos(2\beta_2 + \beta_{ref}) + B \sin(2\beta_2 + \beta_{ref}) + C \cos \beta_2 + D \sin \beta_2 + E$$

$$\vdots$$

$$H_r(\beta_N) = A \cos(2\beta_N + \beta_{ref}) + B \sin(2\beta_N + \beta_{ref}) + C \cos \beta_N + D \sin \beta_N + E$$

Equation Set 22 is an overdetermined equation system for values of N greater than five. For example, when N=32, Equation Set 22 contains 32 equations for $\beta_1$ through $\beta_{32}$ with five unknowns (i.e., the fitting coefficients). The unknown fitting coefficients may be solved from the overdetermined Equation Set 22.

The signal processor solves an overdetermined curve fitting equation system for fitting coefficients for the current receiver (409). The fitting coefficients A, B, C, D, and E for the current receiver can be solved from Equation Set 22 through various methods, such as by solving for the fitting coefficients using the method of least squares with or without matrix decomposition. Embodiments can use other regression analysis methods.

The signal processor continues to solve the curve fitting equation system until each of the active transmitter-receiver pairs $r_i$ through $r_N$ has been accounted for (411). Once the curve fitting equation system depicted in Equation Set 22 has been solved for each transmitter-receiver pair TR, the fitting coefficients $A_{TR}, B_{TR}, C_{TR}, D_{TR},$ and $E_{TR}$ are obtained for each active transmitter-receiver pair.

Based on the fitting coefficients obtained through curve fitting for each active receiver, the signal processor determines nine electromagnetic field tensor components (413). Once the fitting coefficients have been determined for each active transmitter-receiver pair TR, the coupling component relationships depicted in Equation Set 19 and values of the fitting coefficients $A_{TR}, B_{TR}, C_{TR}, D_{TR},$ and $E_{TR}$ are substituted into Equation Set 21 to determine the values of each of the electromagnetic field tensor components $H_{ij}$. In the instance of two transmitter-receiver pairs, Equation Set 23 results:

$$A_{TR1} = (H_{xx} \sin \theta_t \sin \theta_{r1} - H_{yy} \sin \theta_t \sin \theta_{r1})/2 \quad (23)$$

$$B_{TR1} = (H_{xy} \sin \theta_t \sin \theta_{r1} + H_{yx} \sin \theta_t \sin \theta_{r1})/2$$

-continued $$C_{TR1} = H_{zx} \cos\theta_t \sin\theta_{r1} \cos\beta_{ref} + H_{zy} \cos\theta_t \sin\theta_{r1} \sin\beta_{ref} + H_{xz} \sin\theta_t \cos\theta_{r1}$$

$$D_{TR1} = -H_{zx} \cos\theta_t \sin\theta_{r1} \sin\beta_{ref} + H_{zy} \cos\theta_t \sin\theta_{r1} \cos\beta_{ref} + H_{xz} \sin\theta_t \cos\theta_{r1}$$

$$E_{TR1} = (H_{xx} \sin\theta_t \sin\theta_{r1} + H_{yy} \sin\theta_t \sin\theta_{r1}) \cos\beta_{ref}/2 +$$

$$(H_{xy} \sin\theta_t \sin\theta_{r1} - H_{yx} \sin\theta_t \sin\theta_{r1}) \sin\beta_{ref}/2 + H_{zz} \cos\theta_t \cos\theta_{r1}$$

$$A_{TR2} = (H_{xx} \sin\theta_t \sin\theta_{r2} - H_{yy} \sin\theta_t \sin\theta_{r2})/2$$

$$B_{TR2} = (H_{xy} \sin\theta_t \sin\theta_{r1} + H_{yx} \sin\theta_t \sin\theta_{r2})/2$$

$$C_{TR2} = H_{zx} \cos\theta_t \sin\theta_{r2} \cos\beta_{ref} + H_{zy} \cos\theta_t \sin\theta_{r2} \sin\beta_{ref} + H_{xz} \sin\theta_t \cos\theta_{r2}$$

$$D_{TR2} = -H_{zx} \cos\theta_t \sin\theta_{r2} \sin\beta_{ref} + H_{zy} \cos\theta_t \sin\theta_{r2} \cos\beta_{ref} + H_{xz} \sin\theta_t \cos\theta_{r2}$$

$$E_{TR2} = (H_{xx} \sin\theta_t \sin\theta_{r2} + H_{yy} \sin\theta_t \sin\theta_{r2}) \cos\beta_{ref}/2 +$$

$$(H_{xy} \sin\theta_t \sin\theta_{r2} - H_{yx} \sin\theta_t \sin\theta_{r2}) \sin\beta_{ref}/2 + H_{zz} \cos\theta_t \cos\theta_{r2}$$

Equation Set 23 is an overdetermined equation system with ten equations and nine unknowns (i.e., the electromagnetic field tensor components $H_{ij}$). The values of the nine electromagnetic field tensor components $H_{ij}$ can be solved from Equation Set 23. In the case where a third transmitter-receiver pair is present, and the receivers are 90 degrees azimuthally offset to the transmitter, Equation Set 24 as follows may be added onto Equation Set 23:

$$A_{TR3} = (H_{xx} \sin\theta_t \sin\theta_{r3} - H_{yy} \sin\theta_t \sin\theta_{r3})/2 \quad (24)$$

$$B_{TR3} = (H_{xy} \sin\theta_t \sin\theta_{r3} + H_{yx} \sin\theta_t \sin\theta_{r3})/2$$

$$C_{TR3} = H_{zx} \cos\theta_t \sin\theta_{r3} \cos\beta_{ref} + H_{zy} \cos\theta_t \sin\theta_{r3} \sin\beta_{ref} + H_{xz} \sin\theta_t \cos\theta_{r3}$$

$$D_{TR3} = -H_{zx} \cos\theta_t \sin\theta_{r3} \sin\beta_{ref} + H_{zy} \cos\theta_t \sin\theta_{r3} \cos\beta_{ref} + H_{xz} \sin\theta_t \cos\theta_{r3}$$

$$E_{TR3} = (H_{xx} \sin\theta_t \sin\theta_{r3} + H_{yy} \sin\theta_t \sin\theta_{r3}) \cos\beta_{ref}/2 +$$

$$(H_{xy} \sin\theta_t \sin\theta_{r3} - H_{yx} \sin\theta_t \sin\theta_{r3}) \sin\beta_{ref}/2 + H_{zz} \cos\theta_t \cos\theta_{r3}$$

Because the combined equation sets remain an overdetermined system of equations with fifteen equations and nine unknowns, each of the electromagnetic field tensor components $H_{ij}$ can be solved from the combined Equation Set 23 and Equation Set 24. If additional transmitter-receiver pairs are present (i.e., more than three transmitter-receiver pairs), additional equation sets following a similar pattern may be included when solving for the electromagnetic field tensor components $H_{ij}$.

Example Results

Figure 5:
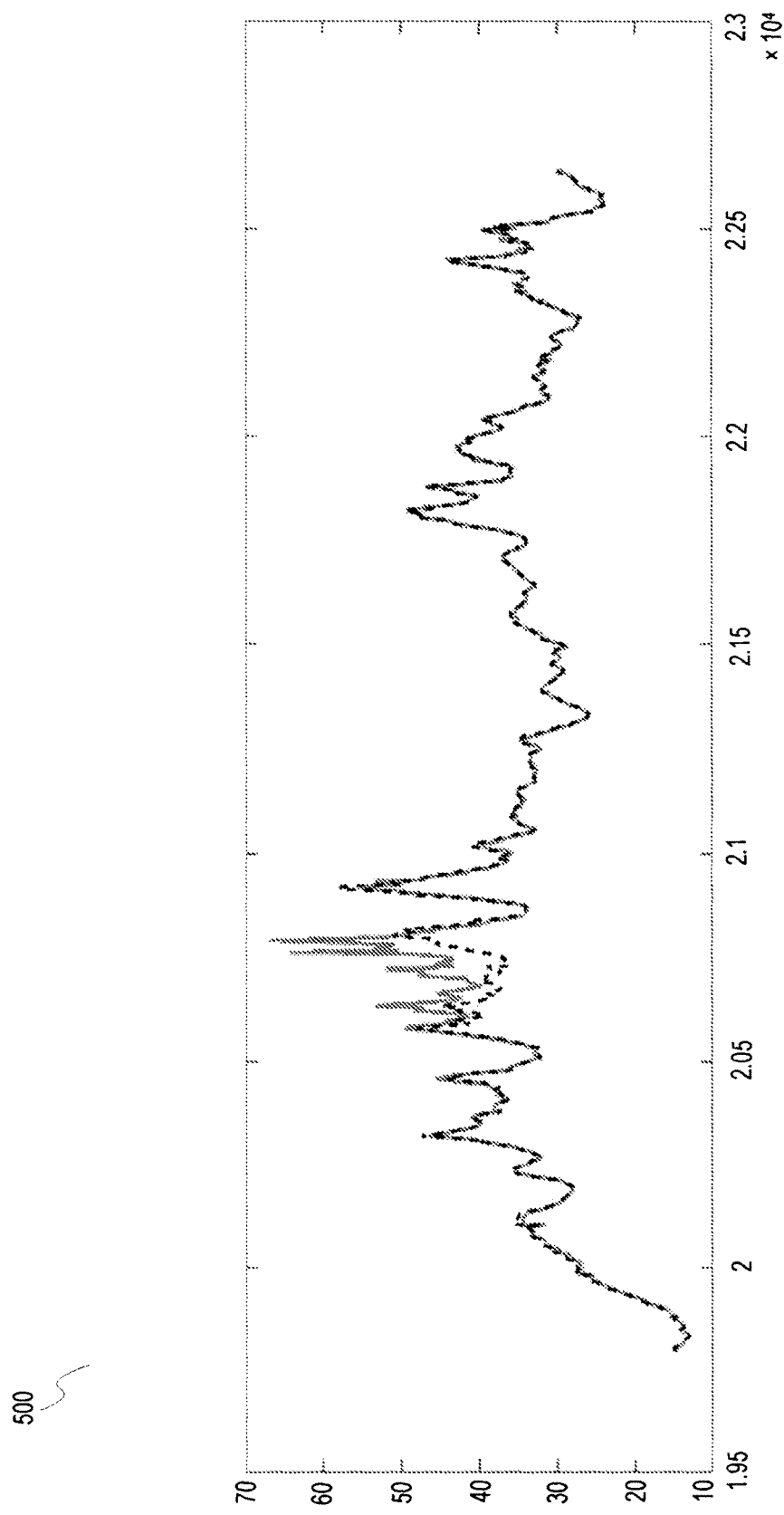
FIG. 5 depicts a plot which demonstrates the differences in measured amplitude for a 3-D inversion process with nine components and 1-D inversion with five components.

FIG. 5 depicts a plot which demonstrates the differences in measured amplitude for a 3-D inversion process with nine components as inputs and 1-D inversion with five components as inputs. Plot 500 includes observed amplitude on the y-axis and measured depth on the x-axis. Plot 500 was generated as a result of decoupling a detected signal which traversed a formation containing 3-D variation within the approximate range of measured depths 20,500 through 21,000. The two plotted lines depict the observed phase at a particular measured depth when leveraging each of five components for a 1-D inversion process and nine components for a 3-D inversion process. The nine components were obtained with the numerical decoupling method described in reference to FIG. 4. The differences between the observed amplitude for the five components and the nine components at the measured depth range of 20,500 to 21,000 feet can be attributed to the presence of 3-D variation in the formation. The 3-D variation in the formation at this measured depth range may have gone undetected and/or may have introduced error into the plotted amplitude for the five components as evident by the differences at measured depths 20,500 through 21,000 in plot 500.

Example Drilling Application

Figure 6:
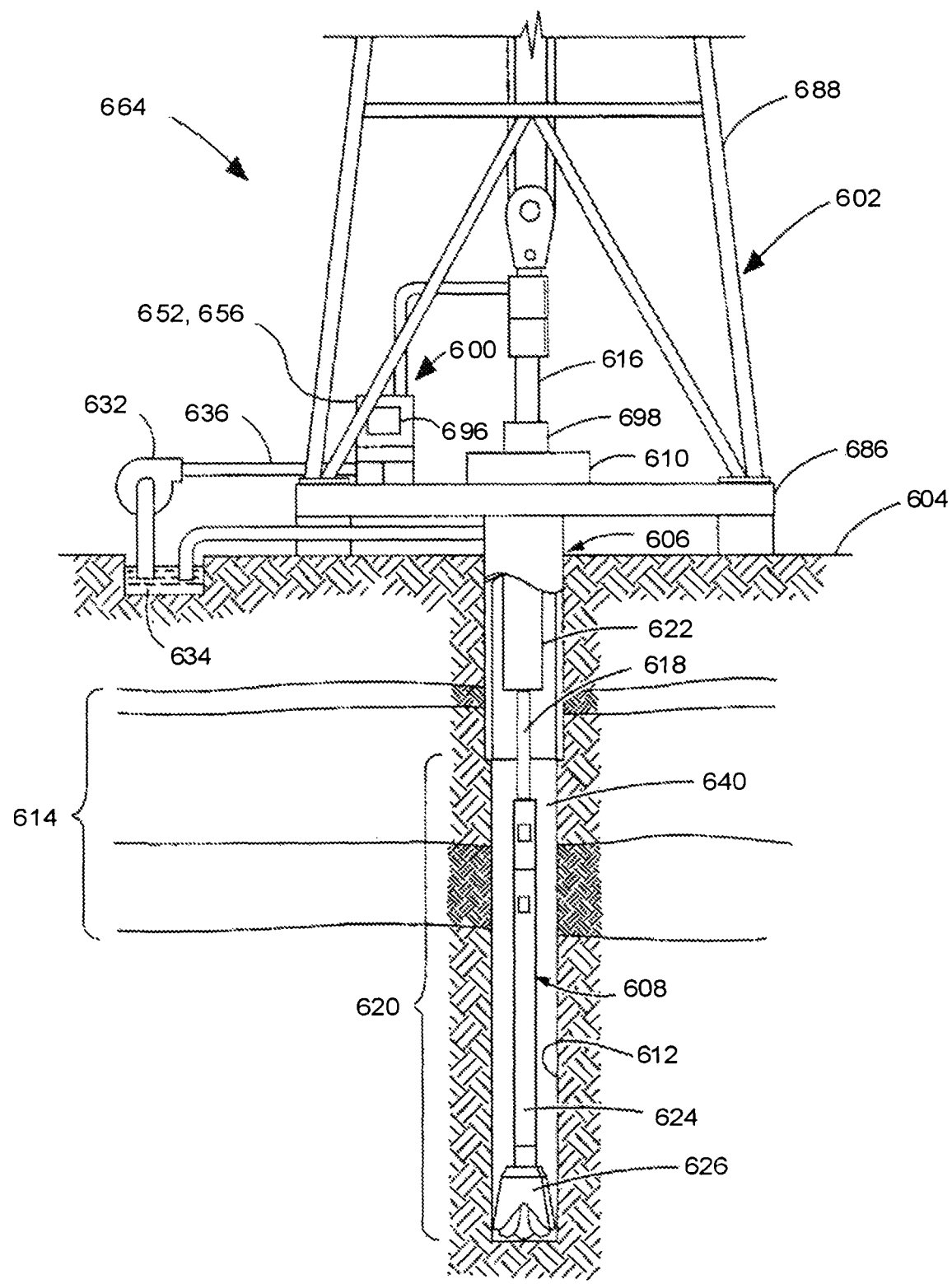
FIG. 6 is a schematic diagram of a drilling rig system.

FIG. 6 is a schematic diagram of a drilling rig system. For example, in FIG. 6, it can be seen how a system 664 may also form a portion of a drilling rig 602 located at the surface 604 of a well 606. Drilling of oil and gas wells is commonly carried out using a string of drill pipes connected together so as to form a drilling string 608 that is lowered through a rotary table 610 into a wellbore or borehole 612. Here, a drilling platform 686 is equipped with a derrick 688 that supports a hoist. The system 664 can include the various examples of a rotating resistivity tool described herein. For example, the rotating resistivity tool can be part of a bottom hole assembly 620 to emit and detect electromagnetic signals during rotational drill operations (e.g., during LWD operations).

The drilling rig 602 may thus provide support for the drill string 608. The drill string 608 may operate to penetrate the rotary table 610 for drilling the borehole 612 through subsurface formations 614. The drill string 608 may include a Kelly 616, drill pipe 618, and the bottom hole assembly 620, perhaps located at the lower portion of the drill pipe 618.

The bottom hole assembly 620 may include drill collars 622, a down hole tool 624, and a drill bit 626. The drill bit 626 may operate to create a borehole 612 by penetrating the surface 604 and subsurface formations 614. The down hole tool 624 may comprise any of a number of different types of tools including MWD tools, LWD tools, and others.

During drilling operations, the drill string 608 (perhaps including the Kelly 616, the drill pipe 618, and the bottom hole assembly 620) may be rotated by the rotary table 610. In addition to, or alternatively, the bottom hole assembly 620 may also be rotated by a motor (e.g., a mud motor) that is located down hole. The drill collars 622 may be used to add weight to the drill bit 626. The drill collars 622 may also operate to stiffen the bottom hole assembly 620, allowing the bottom hole assembly 620 to transfer the added weight to the drill bit 626, and in turn, to assist the drill bit 626 in penetrating the surface 604 and subsurface formations 614.

During drilling operations, a mud pump 632 may pump drilling fluid (sometimes known by those of ordinary skill in the art as "drilling mud") from a mud pit 634 through a hose 636 into the drill pipe 618 and down to the drill bit 626. The drilling fluid can flow out from the drill bit 626 and be returned to the surface 604 through an annular area 640 between the drill pipe 618 and the sides of the borehole 612. The drilling fluid may then be returned to the mud pit 634, where such fluid is filtered. In some embodiments, the drilling fluid can be used to cool the drill bit 626, as well as to provide lubrication for the drill bit 626 during drilling operations. Additionally, the drilling fluid may be used to remove subsurface formation 614 cuttings created by operating the drill bit 626.

Example Wireline Application

Figure 7:
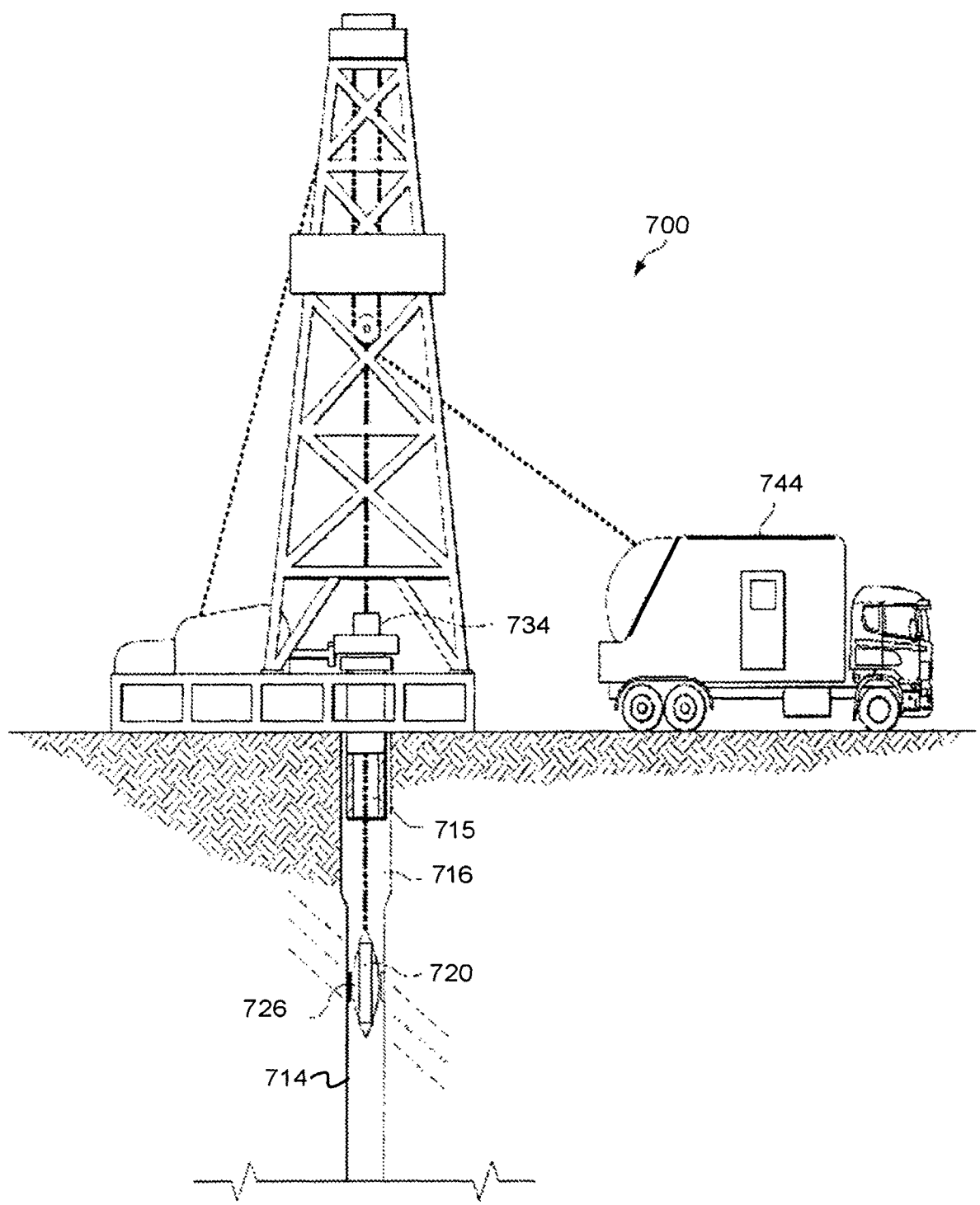
FIG. 7 depicts a schematic diagram of a wireline system.

FIG. 7 depicts a schematic diagram of a wireline system. A rotating resistivity tool can be incorporated into downhole systems such as wireline or slickline systems as illustrated in FIG. 7. A system 700 can be used in an illustrative logging environment with a drillstring removed, in accordance with some embodiments of the present disclosure.

Subterranean operations may be conducted using a wireline system 720 once the drillstring has been removed, though, at times, some or all of the drillstring may remain in a borehole 714 during logging with the wireline system 720. The wireline system 720 may include one or more logging tools 726 that may be suspended in the borehole 714 by a conveyance 715 (e.g., a cable, slickline, or coiled tubing). The logging tool 726 may be communicatively coupled to the conveyance 715. The conveyance 715 may contain conductors for transporting power to the wireline system 720 and telemetry from the logging tool 726 to a logging facility 744. Alternatively, the conveyance 715 may lack a conductor, as is often the case using slickline or coiled tubing, and the wireline system 720 may contain a control unit 734 that contains memory, one or more batteries, and/or one or more processors for performing operations and storing measurements.

In certain embodiments, the control unit 734 can be positioned at the surface, in the borehole (e.g., in the conveyance 715 and/or as part of the logging tool 726) or both (e.g., a portion of the processing may occur downhole and a portion may occur at the surface). The control unit 734 may include a control system or a control algorithm. In certain embodiments, a control system, an algorithm, or a set of machine-readable instructions may cause the control unit 734 to generate and provide an input signal to one or more elements of the logging tool 726, such as the sensors along the logging tool 726. The input signal may cause the sensors to be active or to output signals indicative of sensed properties. The logging facility 744 (shown in FIG. 7 as a truck, although it may be any other structure) may collect measurements from the logging tool 726, and may include computing facilities for controlling, processing, or storing the measurements gathered by the logging tool 726. The computing facilities may be communicatively coupled to the logging tool 726 by way of the conveyance 715 and may operate similarly to the control unit 734. In certain example embodiments, the control unit 734, which may be located in logging tool 726, may perform one or more functions of the computing facility.

The logging tool 726 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

Variations

FIG. 1 depicts a resistivity tool with one transmitter and two receivers with tilted antennas. FIG. 1 depicts the tilted antennas of the two receivers with a cross-antenna configuration. Rather than a cross-antenna receiver configuration, the receivers may be oriented separately (e.g., located on different subs, with spacing present between each receiver antenna, etc.). The resistivity tool can also contain three receivers. Additionally, though FIG. 1 depicts two receivers and one transmitter, the resistivity tool may include multiple transmitters and one receiver. The transmitters may or may not include a cross-antenna configuration. For instance, the resistivity tool may contain two transmitters and one receiver. FIG. 1 depicts one example of a resistivity tool transmitter and receiver configuration, and multiple configurations are possible.

The examples often refer to a "signal processor." The signal processor is a construct used to refer to implementation of functionality for decoupling electromagnetic field tensor components from a detected signal after emission of the signal from a transmitter, traversal through a surrounding formation, and detection by a receiver. This construct is utilized since numerous implementations are possible. A signal processor may be a particular component or components of a machine (e.g., a particular circuit card enclosed in a housing with other circuit cards/boards), machine-executable program or programs, firmware, a circuit card with circuitry configured and programmed with firmware, etc. The term is used to efficiently explain content of the disclosure. Although the examples refer to operations being performed by a signal processor, different entities can perform different operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 3, the operations depicted in blocks 301-309 can be performed in parallel or concurrently for each azimuth angle $\beta_1$ through $\beta_N$ at which an electromagnetic signal is emitted and detected after traversing the formation for subsequent decoupling of components. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
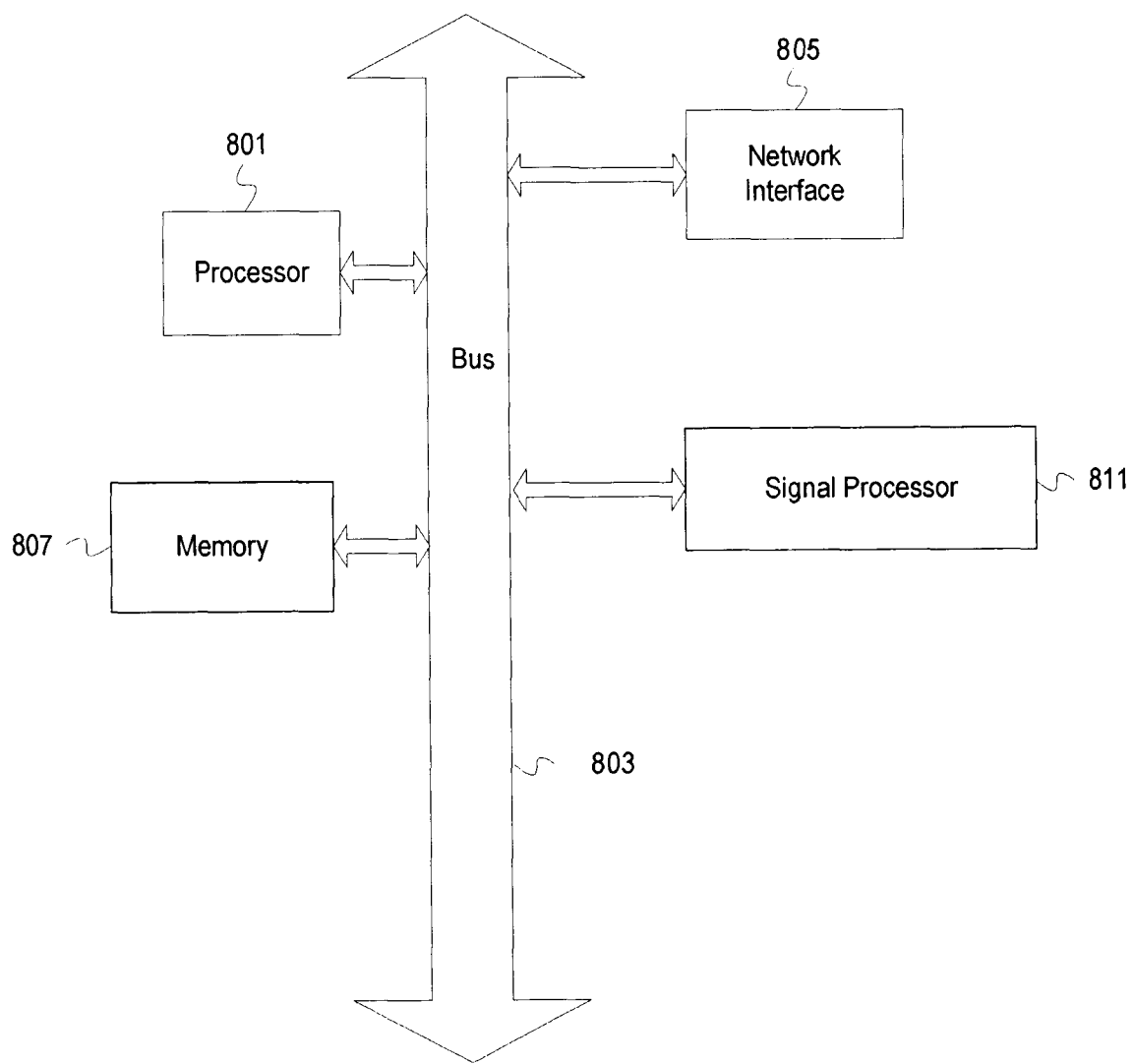
FIG. 8 depicts an example computer system with a signal processor for tensor decoupling without matrix inversion.

FIG. 8 depicts an example computer system with a signal processor for tensor decoupling without matrix inversion. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes signal processor 811. The signal processor 811 decouples electromagnetic field tensor components from a detected signal which has traversed a surrounding formation following transmission of an electromagnetic signal into the formation. The signal processor 811 may be located downhole or at the surface of the formation. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for full electromagnetic field tensor component decoupling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Terminology

This description uses the term "electromagnetic field" to refer to a field which consists of electric and/or magnetic components. As used by this description, an electromagnetic field encompasses an electric field, a magnetic field, or an electromagnetic field. Tensor components of the electromagnetic field referred to in this description can correspond to components of the electric field, magnetic field, or electromagnetic field.

Example Embodiments

A method comprises detecting at a first receiver of a set of one or more receivers a formation response to electromagnetic radiation emitted from a first transmitter of a set of one or more transmitters. Complex azimuthal electromagnetic field data corresponding to the formation response is determined. A first plurality of non-zero tensor components is decoupled from the complex azimuthal electromagnetic field data without matrix inversion. The decoupling comprises numerically decoupling if an azimuthal offset between the first transmitter and the first receiver is known. The decoupling comprises semi-analytically decoupling if the azimuthal offset between the first transmitter and the first receiver is unknown.

Semi-analytically decoupling comprises calculating a minimum for the azimuthal offset if the azimuthal offset is unknown. A parallel signal value and a perpendicular signal value corresponding to pairing of the set of one or more transmitters and set of one or more receivers are determined. A sum of the parallel signal value and the perpendicular signal value and a difference of the parallel signal value and the perpendicular signal value are calculated. A first subset of the first plurality of nonzero tensor components is determined based, at least in part, on the calculated azimuthal offset minimum and at least one of the sum and the difference.

The method further comprises performing a tensor rotation on the first subset of nonzero tensor components to determine a second subset of the first plurality of nonzero tensor components. The first and the second subset of nonzero tensor components form the first plurality of nonzero tensor components.

Numerically decoupling the first plurality of nonzero tensor components comprises fitting a plurality of curve representations corresponding to the azimuthal angles at which measurements have been taken corresponding to the formation response. Fitting the plurality of curve representations comprises fitting each curve representation based on the known azimuthal offset, fitting coefficients, and formation response measurements at the corresponding one of the azimuthal angles. The fitting coefficients across the plurality of curve representations are determined for each pairing between the set of one or more transmitters and the set of one or more receivers. The first plurality of nonzero tensor components is calculated based, at least in part, on the fitting coefficients.

Calculating the first plurality of nonzero tensor components based on the fitting coefficients comprises solving for each receiver of the set of one or more receivers, $$H_r(\beta_i) = A\cos(2\beta_i+\beta_{ref}) + B\sin(2\beta_i+\beta_{ref}) + C\cos\beta_i + D\sin\beta_i + E,$$

where A represents the formation response measurement at the azimuthal angle bin i for receiver r, $\beta_{ref}$ indicates the known azimuthal offset corresponding to the receiver, and A, B, C, D, and E are the fitting coefficients.

Solving for each receiver comprises regression analysis.

The regression analysis comprises the least squares method.

The decoupling is performed downhole.

It is determined whether a dogleg angle exists between a transmitter sub and a receiver sub. Based on a determination that the dogleg angle exists, angles of tilt of those of the set of one or more receivers and set of one or more transmitters corresponding to the transmitter sub and the receiver sub are determined. The angles of tilt are corrected based, at least in part, on a measurement of the dogleg angle. The decoupling uses the corrected angles of tilt.

The method further comprises communicating the plurality of nonzero tensor components uphole.

One or more non-transitory machine-readable media comprise program code executable by a processor to perform operations comprising determining complex azimuthal electromagnetic field data corresponding to a formation response to electromagnetic radiation emitted from at least a first transmitter of a set of one or more transmitters and detected by a set of one or more receivers. A first plurality of non-zero tensor components are decoupled from the complex azimuthal electromagnetic field data without matrix inversion. The decoupling comprises numerically decoupling if an azimuthal offset between the first transmitter and the set of one or more receivers is known. The decoupling comprises semi-analytically decoupling if the azimuthal offset is unknown.

Semi-analytically decoupling comprises calculating a minimum for the azimuthal offset if the azimuthal offset is unknown. A parallel signal value and a perpendicular signal value corresponding to pairing of the set of one or more transmitters and set of one or more receivers is determined. A sum of the parallel signal value and the perpendicular signal value and a difference of the parallel signal value and the perpendicular signal value are calculated. A first subset of the first plurality of nonzero tensor components is determined based, at least in part, on the calculated azimuthal offset minimum and at least one of the sum and the difference.

The operations further comprise performing a tensor rotation on the first subset of nonzero tensor components to determine a second subset of the first plurality of nonzero tensor components. The first and the second subset of nonzero tensor components form the first plurality of nonzero tensor components.

Numerically decoupling the first plurality of nonzero tensor components comprises fitting a plurality of curve representations corresponding to the azimuthal angles at which measurements have been taken corresponding to the formation response. Fitting the plurality of curve representations comprises fitting each curve representation based on the known azimuthal offset, fitting coefficients, and formation response measurements at the corresponding one of the azimuthal angles. Fitting coefficients across the plurality of curve representations are determined for each pairing between the set of one or more transmitters and the set of one or more receivers. Based, at least in part, on the fitting coefficients, the first plurality of nonzero tensor components are calculated.

Calculating the first plurality of nonzero tensor components based on the fitting coefficients comprises solving for each receiver of the set of one or more receivers $$H_r(\beta_i) = A\cos(2\beta_i+\beta_{ref}) + B\sin(2\beta_i+\beta_{ref}) + C\cos\beta_i + D\sin\beta_i + E,$$

where $\beta_i$ represents the formation response measurement at the azimuthal angle bin i for receiver r, $\beta_{ref}$ indicates the known azimuthal offset corresponding to the receiver, and A, B, C, D, and E are the fitting coefficients.

The operations further comprise determining whether a dogleg angle exists between a transmitter sub and a receiver sub. Based on a determination that the dogleg angle exists, angles of tilt of those of the set of one or more receivers and set of one or more transmitters corresponding to the transmitter sub and the receiver sub are determined. The angles of tilt are corrected based, at least in part, on a measurement of the dogleg angle, where the decoupling uses the corrected angles of tilt.

An apparatus comprises a multi-sub tool having a transmitter sub with at least one transmitter antenna and a receiver sub with at least one receiver antenna, a processor, and a machine-readable medium having program code executable by the processor to cause the apparatus to determine complex azimuthal electromagnetic field data corresponding to a formation response to electromagnetic radiation emitted from at least a first transmitter of a set of one or more transmitters and detected by a set of one or more receivers. A first plurality of non-zero tensor components is decoupled from the complex azimuthal electromagnetic field data without matrix inversion. The program code to decouple comprises program code to numerically decouple if an azimuthal offset between the first transmitter and the set of one or more receivers is known. The program code to decouple comprises program code to semi-analytically decouple if the azimuthal offset is unknown.

The program code to semi-analytically decouple comprises instructions to calculate a minimum for the azimuthal offset if the azimuthal offset is unknown. A parallel signal value and a perpendicular signal value corresponding to pairing of the set of one or more transmitters and set of one or more receivers are determined. A sum of the parallel signal value and the perpendicular signal value and a difference of the parallel signal value and the perpendicular signal value are calculated. A first subset of the first plurality of nonzero tensor components is determined based, at least in part, on the calculated azimuthal offset minimum and at least one of the sum and the difference.

The program code further comprises program code executable by the processor to cause the apparatus to perform a tensor rotation on the first subset of nonzero tensor components to determine a second subset of the first plurality of nonzero tensor components. The first and the second subset of nonzero tensor components form the first plurality of nonzero tensor components.

The program code to numerically decouple the first plurality of nonzero tensor components comprises program code to fit a plurality of curve representations corresponding to the azimuthal angles at which measurements have been taken corresponding to the formation response. The program code to fit the plurality of curve representations comprises program code to fit each curve representation based on the known azimuthal offset, fitting coefficients, and formation response measurements at the corresponding one of the azimuthal angles. The fitting coefficients across the plurality of curve representations are determined for each pairing between the set of one or more transmitters and the set of one or more receivers. The first plurality of nonzero tensor components is calculated based, at least in part, on the fitting coefficients.

What is claimed is:

1. A method comprising:
   detecting, at a first receiver of a set of one or more receivers a formation response to electromagnetic radiation emitted from a first transmitter of a set of one or more transmitters, wherein the first receiver is tilted at a first angle of tilt and the first transmitter is tilted at a second angle of tilt;
   determining complex azimuthal electromagnetic field data corresponding to the formation response;
   decoupling a first plurality of nonzero tensor components from the complex azimuthal electromagnetic field data without matrix inversion,
   wherein the decoupling comprises numerically decoupling if an azimuthal offset between the first transmitter and the first receiver is known and semi-analytically decoupling if the azimuthal offset between the first transmitter and the first receiver is unknown,
   wherein the decoupling is performed downhole; and
   communicating the first plurality of nonzero tensor components uphole.

2. The method of claim 1, wherein semi-analytically decoupling comprises:
   calculating a minimum for the azimuthal offset if the azimuthal offset is unknown;
   determining a parallel signal value and a perpendicular signal value corresponding to pairing of the set of one or more transmitters and set of one or more receivers;
   calculating a sum of the parallel signal value and the perpendicular signal value and a difference of the parallel signal value and the perpendicular signal value; and
   determining a first subset of the first plurality of nonzero tensor components based, at least in part, on the calculated azimuthal offset minimum and at least one of the sum and the difference.

3. The method of claim 2, further comprising performing a tensor rotation on the first subset of nonzero tensor components to determine a second subset of the first plurality of nonzero tensor components, wherein the first and the second subset of nonzero tensor components form the first plurality of nonzero tensor components.

4. The method of claim 1, wherein numerically decoupling the first plurality of nonzero tensor components comprises:
   fitting a plurality of curve representations corresponding to azimuthal angles at which measurements have been taken corresponding to the formation response,
   wherein fitting the plurality of curve representations comprises fitting each curve representation based on the known azimuthal offset, fitting coefficients, and formation response measurements at the corresponding one of the azimuthal angles;
   determining the fitting coefficients across the plurality of curve representations for each pairing between the set of one or more transmitters and the set of one or more receivers; and
   based, at least in part, on the fitting coefficients, calculating the first plurality of nonzero tensor components.

5. The method of claim 4, wherein calculating the first plurality of nonzero tensor components based on the fitting coefficients comprises solving for each receiver of the set of one or more receivers, $$H_r(\beta_i) = A\cos(2\beta_i + \beta_{ref}) + B\sin(2\beta_i + \beta_{ref}) + C\cos\beta_i + D\sin\beta_i + E,$$

wherein $\beta_i$ represents the formation response measurement at an azimuthal angle bin i for receiver r, $\beta_{ref}$ indicates the known azimuthal offset corresponding to the receiver, and A, B, C, D, and E are the fitting coefficients.

6. The method of claim 5, wherein solving comprises regression analysis.

7. The method of claim 6, wherein the regression analysis comprises a least squares method.

8. The method of claim 1 further comprising:
   determining whether a dogleg angle exists between a transmitter sub and a receiver sub;
   based on a determination that the dogleg angle exists, determining angles of tilt of those of the set of one or more receivers and set of one or more transmitters corresponding to the transmitter sub and the receiver sub; and correcting the angles of tilt based, at least in part, on a measurement of the dogleg angle, wherein the decoupling uses the corrected angles of tilt.

9. One or more non-transitory machine-readable media comprising program code executable by a processor to perform operations comprising:

determining complex azimuthal electromagnetic field data corresponding to a formation response to electromagnetic radiation emitted from at least a first transmitter of a set of one or more transmitters and detected by a set of one or more tilted receivers, wherein the first transmitter is tilted at a first angle of tilt;

decoupling a first plurality of nonzero tensor components from the complex azimuthal electromagnetic field data without matrix inversion, wherein the decoupling comprises numerically decoupling if an azimuthal offset between the first transmitter and the set of one or more titled receivers is known and semi-analytically decoupling if the azimuthal offset is unknown, wherein the decoupling is performed downhole; and communicating the first plurality of nonzero tensor components uphole.

10. The non-transitory machine-readable media of claim 9, wherein semi-analytically decoupling comprises:

calculating a minimum for the azimuthal offset if the azimuthal offset is unknown;

determining a parallel signal value and a perpendicular signal value corresponding pairing of the set of one or more transmitters and set of one or more receivers;

calculating a sum of the parallel signal value and the perpendicular signal value and a difference of the parallel signal value and the perpendicular signal value; and determining a first subset of the first plurality of nonzero tensor components based, at least in part, on the calculated azimuthal offset minimum and at least one of the sum and the difference.

11. The non-transitory machine-readable media of claim 10, wherein the operations further comprise performing a tensor rotation on the first subset of nonzero tensor components to determine a second subset of the first plurality of nonzero tensor components, wherein the first and the second subset of nonzero tensor components form the first plurality of nonzero tensor components.

12. The non-transitory machine-readable media of claim 9, wherein numerically decoupling the first plurality of nonzero tensor components comprises:

fitting a plurality of curve representations corresponding to azimuthal angles at which measurements have been taken corresponding to the formation response, wherein fitting the plurality of curve representations comprises fitting each curve representation based on the known azimuthal offset, fitting coefficients, and formation response measurements at the corresponding one of the azimuthal angles;

determining the fitting coefficients across the plurality of curve representations for each pairing between the set of one or more transmitters and the set of one or more tilted receivers; and based, at least in part, on the fitting coefficients, calculating the first plurality of nonzero tensor components.

13. The non-transitory machine-readable media of claim 12, wherein calculating the first plurality of nonzero tensor components based on the fitting coefficients comprises solving for each receiver of the set of one or more tilted receivers $$H_r(\beta_i) = A \cos(2\beta_i + \beta_{ref}) + B \sin(2\beta_i + \beta_{ref}) + C \cos \beta_i + D \sin \beta_i + E,$$

wherein $\beta_i$ represents the formation response measurement at an azimuthal angle bin i for receiver r, $\beta_{ref}$ indicates the known azimuthal offset corresponding to the receiver, and A, B, C, D, and E are the fitting coefficients.

14. The non-transitory machine-readable media of claim 9, wherein the operations further comprise:

determining whether a dogleg angle exists between a transmitter sub and a receiver sub;

based on a determination that the dogleg angle exists, determining angles of tilt of those of the set of one or more tilted receivers and set of one or more transmitters corresponding to the transmitter sub and the receiver sub; and correcting the angles of tilt based, at least in part, on a measurement of the dogleg angle, wherein the decoupling uses the corrected angles of tilt.

15. An apparatus comprising:

a multi-sub tool having a transmitter sub with at least one transmitter antenna tilted at a first angle of tilt and a receiver sub with at least one receiver antenna tilted at a second angle of tilt;

a processor; and a machine-readable medium having program code executable by the processor to cause the apparatus to, determine complex azimuthal electromagnetic field data corresponding to a formation response to electromagnetic radiation emitted from at least a first transmitter of a set of one or more transmitters and detected by a set of one or more receivers;

decouple a first plurality of nonzero tensor components from the complex azimuthal electromagnetic field data without matrix inversion, wherein the program code to decouple comprises program code to numerically decouple if an azimuthal offset between the first transmitter and the set of one or more receivers is known and program code to semi-analytically decouple if the azimuthal offset is unknown, wherein the decoupling is performed downhole; and communicate the first plurality of nonzero tensor components uphole.

16. The apparatus of claim 15, wherein the program code to semi-analytically decouple comprise instructions to:

calculate a minimum for the azimuthal offset if the azimuthal offset is unknown;

determine a parallel signal value and a perpendicular signal value corresponding pairing of the set of one or more transmitters and set of one or more receivers;

calculate a sum of the parallel signal value and the perpendicular signal value and a difference of the parallel signal value and the perpendicular signal value; and determine a first subset of the first plurality of nonzero tensor components based, at least in part, on the calculated azimuthal offset minimum and at least one of the sum and the difference.

17. The apparatus of claim 16, wherein the program code further comprises program code executable by the processor to cause the apparatus to perform a tensor rotation on the first subset of nonzero tensor components to determine a second subset of the first plurality of nonzero tensor components, wherein the first and the second subset of nonzero tensor components form the first plurality of nonzero tensor components.

18. The apparatus of claim 15, wherein the program code to numerically decouple the first plurality of nonzero tensor components comprises program code to:
- fit a plurality of curve representations corresponding to azimuthal angles at which measurements have been taken corresponding to the formation response,
  - wherein the program code to fit the plurality of curve representations comprises program code to fit each curve representation based on the known azimuthal offset, fitting coefficients, and formation response measurements at the corresponding one of the azimuthal angles;
- determine the fitting coefficients across the plurality of curve representations for each pairing between the set of one or more transmitters and the set of one or more receivers; and
- based, at least in part, on the fitting coefficients, calculate the first plurality of nonzero tensor components.

\* \* \* \* \*